United States Patent [19]

Fong

[11] Patent Number: 4,676,911
[45] Date of Patent: Jun. 30, 1987

[54] SCALE INHIBITORS WHICH CONTAIN SULFATE-CONTAINING POLYMERS

[75] Inventor: Dodd W. Fong, Naperville, Ill.

[73] Assignee: Nalco Chemical Company, Oak Brook, Ill.

[21] Appl. No.: 868,549

[22] Filed: May 30, 1986

Related U.S. Application Data

[62] Division of Ser. No. 735,527, May 20, 1985, abandoned.

[51] Int. Cl.$^4$ ............................................. C02F 5/10
[52] U.S. Cl. ............................................. 210/701
[58] Field of Search ............... 210/700, 701, 696, 698, 210/699, 725, 728, 732, 733, 734, 735

[56] References Cited

U.S. PATENT DOCUMENTS 4,500,693  2/1985  Takehara ........................... 526/240

Primary Examiner—Christopher Henderson
Attorney, Agent, or Firm—John G. Premo; Anthony L. Cupoli; Donald G. Epple

[57] ABSTRACT

A novel, water-soluble, sulfated vinyl monomer is presented; and scale-inhibiting agents are provided which are particularly effective against phosphate scale and which comprise an alkylolamide sulfate or an alkylolanilide sulfate, polymerized with an alkenyl compound such as acrylic acid or the like.

2 Claims, No Drawings

SCALE INHIBITORS WHICH CONTAIN SULFATE-CONTAINING POLYMERS

This is a division, of application Ser. No. 735,527 filed May 20, 1985, now abandoned.

FIELD OF THE INVENTION

This invention relates generally to chemical agents for inhibiting the deposit of mineral scale in industrial water systems and like equipment. The invention relates more particularly to chemical agents which act to inhibit the formation of calcium phosphate scale and similar deposits in cooling water systems. In one specific aspect, the present invention relates to a novel, water-soluble, sulfated vinyl monomer and to its polymerization products.

BACKGROUND OF THE INVENTION

Water is caused to flow through various types of piping and heat exchanger systems for extracting heat from turbine steam, chemical processes, and numerous other operations. Common to all of these applications is the exposure of comparatively cool, flowing water to a comparatively hot metal surface; and this combination of factors promotes the precipitation or deposit of various salt matrices, depending upon the mineral content of the cooling water. The resultant scale interferes with efficient heat transfer, leading ultimately to destructive overheating of the system, and may, in extreme cases, produce clogging as a final consequence of reducing the lumen-size of the conduits involved.

Scale deposits of calcium phosphate have proved to be especially troublesome because of their resistance to removal and because of the difficulties encountered in inhibiting their formation.

SUMMARY OF THE INVENTION

The present invention offers a novel, water-soluble, sulfated vinyl monomer and a family of new and improved sulfate polymers which exhibit remarkable, phosphate-scale inhibitory properties. In one specific embodiment, the present invention contemplates the creation of acrylamide and acrylanilide sulfates which can be easily reacted with an alkenyl compound, such as acrylic acid, to produce water-soluble polymers exhibiting strong, scale inhibitory properties. For example, mono (4-methacrylamido-phenyl) sulfite polymers have been prepared according to the invention and, when dosed at the 5 p.p.m. level, have been found to be superior to such conventional scale antagonists as the co-polymers of sulfonated styrene and maleic acid and the co-polymers of hydroxypropyl acrylate and acrylic acid.

DETAILED DESCRIPTION OF THE INVENTION

In the practice of the present invention, an alkylolamide or an alkylolanilide is selected as the starting material to be converted to the corresponding sulfate by reaction with such agents as sulfuric acid, sulfur trioxide, or chlorosulfonic acid. The resultant sulfates are then polymerized with a suitable alkenyl compound, such as acrylic acid; and it has been found that the activity of the ultimate polymer as a scale antagonist is increased with increasing degrees of sulfation of the nitrogen-containing monomer.

The starting material for use in the present invention is selected to be an alkylolamide or an alkylolanilide having the general structural formula:

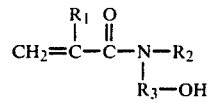

wherein Rhd 1 represents either an alkyl group having one to three carbon atoms or a hydrogen atom; wherein $R_2$ represents an alkyl group having one to three carbon atoms, a hydrogen atom or an alkylol group; and wherein $R_3$ represents a bond, an alkylene group having one to eight carbon atoms, or a phenyl group.

Examples of preferred starting materials include p-hydroxy-methacrylanilide and 2-hydroxy-ethylacrylamide. These compounds are advantageous from the standpoint of the amenability of their reaction products to further synthesis. However, various aliphatic, cyclo-aliphatic and aromatic hydroxy compounds may find utility in the invention.

In accordance with an important feature of the present invention, the starting compound is sulfated using one of the various compounds of sulfur trioxide. The particular sulfating agent is selected on the basis of cost and ease of handling; and chlorosulfonic acid is generally preferred for both laboratory and batch scale operations where glass-lined vessels can be readily employed. When the starting hydroxy compound is normally solid at temperatures above 30° C., it will be first melted or suspended in a suitable solvent such as chloroform or carbon tetrachloride; and under circumstances where a particularly mild sulfation reaction is desired, the chlorosulfonic acid will be preliminarily complexed with ethyl ether for example. Moreover, unbalanced patterns of heat and gas evolution may be attenuated by initially saturating the starting compound with hydrogen chloride.

Sulfation is caused to take place at about room temperature or at a mildly elevated temperature of about 30°-35° C.; and the sulfated product is advantageously dissolved in a caustic solution to facilitate separation of any solvent present and to neutralize any residual hydrochloric acid. The resultant sulfated vinyl monomer is then dried under vacuum. Yields of the sulfated product range from 70% to over 95% of theoretical.

The sulfated vinyl monomer is reacted with itself to form a homopolymer or with one or more suitable alkenyl compounds using conventional bulk, suspension, solvent, or emulsion techniques; and it is generally desirable to conduct the polymerization under alkaline conditions about a pH of 8.0 in order to promote water-solubility of the final product. Polymerization initiators such as diammonium peroxysulfate and sodium bisulfite are also usefully employed.

The alkenyl compounds of the invention are specifically selected to be carboxylic acids and to have the general structural formula:

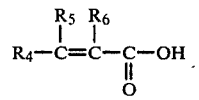

wherein $R_5$ and $R_6$ represent either hydrogen or an alkyl group having one to three carbon atoms, and $R_4$ represents either hydrogen, an alkyl group having one to three carbon atoms, or a carboxylic acid group.

Preferred alkenyl compounds for polymerization include such comparatively short-chain unsaturated carboxylic acids as acrylic acid, methacrylic acid, maleic acid and itaconic acid; and the reactant or reactants are specifically chosen to give co-polymers and terpolymers which possess an average molecular weight in the range of about 3,000 to about 250,000. These have proved to exhibit optimum activity as scale antagonists.

While it is not desired to be limited to any theory, it is believed that molecules of the co-polymers and terpolymers of the present invention attach themselves, by means of adsorption on the surfaces of the incipiently developing scale crystals and, once in place, inhibit further growth of the crystal, the stronger complexing carboxylic acid moiety serving the attachment function and the more polar sulfate moiety providing the repellent mechanism.

In order to describe the invention more fully, the following working examples are given without, however, intending to limit the invention to the precise details and conditions described.

EXAMPLE 1

An acrylanilide sulfate co-polymer was synthesized by first suspending 17.7 g (0.1 mol) of p-hydroxymethacrylanilide in 100 ml of methylene chloride in a suitable glass reaction vessel and then adding 12 g of chlorosulfonic acid to the suspension. Hydrogen chloride gas was observed evolving during the addition; and the reaction mass was mechanically stirred overnight at room temperature. The resultant product was dissolved in a solution of 60 g water and about 10 g of 50% sodium hydroxide, giving a pH of about 11; and methylene chloride was then separated by vacuum. A yield of about 75% of sulfated monomer, observed to be a viscous liquid, was then determined using nuclear magnetic resonance techniques.

A 55.5 g quantity of the sulfated monomer, estimated to be about 28% active material, was thereafter mixed with 28.8 g of acrylic acid; and the resultant mass was heated to 65° C. with mechanical agitation. Next, 3 g of diammonium peroxysulfate and 8.18 g of sodium bisulfite were added; the pH was adjusted to 7.2 using caustic; and the mixture was maintained at 65° C. for three hours in continuation of agitation. The resulting co-polymer was estimated to contain about 13% active material with an average molecular weight of about 55,000 as determined by GPC in aqueous solution using sulfonated polystyrene as a standard. The effectiveness of this co-polymer as a scale inhibitor is set forth in Table I hereinbelow.

EXAMPLE 2

A sulfate monomer was again prepared from p-hydroxymethacrylanilide in accordance with the method of Example 1; and 80.0 g of this material was mixed with 12.36 g of acrylic acid, 100.07 g of water and 13.47 g of 50% sodium hydroxide. The mixture was purged with nitrogen at room temperature and heated to 62° C. Thereafter, 1.17 g of diammonium peroxysulfate was added and then 3.51 g of sodium bisulfite. The temperature of the reaction mass rose to 67° C. and was thereupon cooled to 65° C. where the temperature was maintained for four hours. The average molecular weight of the resulting co-polymer was determined to be 20,000 by GPC; and its scale inhibitory efficacy is set forth in Table I hereinbelow.

The calcium phosphate inhibitory power of various polymers has been evaluated using the following procedure, employing test chemicals of reagent grade:

(1) Put 300 to 350 ml of DI water in 600 ml jacketed beakers and let stand with mild stirring until temperature is brought to 150 degrees F. (70 degrees C.) by use of a constant temperature water bath.

(2) Put in required ml of stock hardness solution into jacketed beakers: For 250 p.p.m. $CaCO_3$ use 50 ml or any desired hardness—

To make 2 liters of stock solution:
A. Dissolve 7.356 g $CaCl_2.2H_2O$ in 800 ml DI $H_2O$;
B. Dissolve 6.156 g $MgSO_4.7H_2O$ in 800 ml DI $H_2O$;
C. Add both solutions to 2 liter volumetric flask and dilute to colume;
D. Shake well.

(3) Add sufficient ml of treatment product into jacketed beakers while stirring (normally 5 mls for 10 p.p.m. concentration).

(4) Add DI water to make 500 ml in jacketed beakers (add water to line on beaker with stirrer not operating).

(5) With stirring, let solutions in beakers equilibriate to 158 degrees F.

(6) With stirring, adjust pH to 8.5 with dilute (0.1-p.4N) NaOH.

(7) Add 5 ml of 1000 p.p.m. $PO_4$, pH-8.5 solution to jacketed beakers and wait about 3–5 minutes while stirring.

(8) Check pH of solution in beakers and as necessary adjust pH to 8.5±0.1 while stirring.

(9) Let experiment run at 158 degrees F. with stirring for 4 hours.

(10) After 15 minutes, check pH of solutions in beakers and as necessary adjust pH to 8.5±0.1. Also, check pH of solutions every 30 to 45 minutes thereafter.

(11) After the 4 hours are up, the solution is immediately filtered through 0.45 micron filter paper under vacuum. The filtered solution is analyzed for o-$PO_4$ using standard procedure and the color is evaluated in a spectrophotometer at 700 nm.

(12) The results are reported as percent inhibition calculated by the following formula:

$$\text{inhibition} = \frac{(\text{residual o-}PO_4) - (\text{blank residual o-}PO_4)}{(\text{initial o-}PO_4) - (\text{blank residual o-}PO_4)} \times 100$$

WHERE:
initial-o-$PO_4$ = o-$PO_4$ concentration in the mixture at the beginning of the experiment.
residual-o-$PO_4$ = o-$PO_4$ concentration in the mixture at the end of the experiment with stabilizer.
blank residual-o-$PO_4$ = o-$PO_4$ concentration in the filtrate at the end of the experiment with no stabilizer.

The foregoing procedure was utilized to compare the co-polymers of Examples 1 and 2 with two commercial scale inhibitors in their ability to attenuate the development of phosphate scale. The results are as follows:

TABLE I

| SCALE INHIBITOR | POLYMER COMPOSITION - (MOLE RATIO) | Mw | PERCENT CALCIUM PHOSPHATE INHIBITION (POLYMER DOSAGE IN P.P.M.) | | | | |
|---|---|---|---|---|---|---|---|
| | | | 5 | 7.5 | 10 | 15 | 20 |
| commercial | Sulfonated styrene/maleic acid (75/25) | 18,950 | 8 | — | 87 | — | — |
| commercial | Acrylic acid/Hydroxypropyl acrylate (25/75) | 7,350 | 13 | 75 | 92 | — | — |
| Example 1 | Acrylic acid/methacrylamidophenyl sulfate (~75% pure) (80/20) | 55,000 | — | — | 12 | 60 | 82 |
| Example 2 | Acrylic acid/methacrylamidophenyl sulfate (~80% pure) (80/20) | 20,000 | 68 | 88 | 100 | — | 100 |

As will be appreciated, the co-polymer of Example 2 of the present invention is superior to the two commercial products, especially at the lowest, most economical additive level.

EXAMPLE 3

An acrylamide sulfate monomer was first prepared by reacting 35 g of 2-hydroxyethylacrylamide directly with 35 g of chlorosulfonic acid at 35° C. in a suitable glass vessel. The solution became viscous and finally formed a rubbery mass; and the mixture foamed extensively at the later stages in the addition of the chlorosulfonic acid. The product was dissolved in sodium hydroxide solution to a pH of about 8.5.

A co-polymer was synthesized by reacting 127.6 g of the acrylamide sulfate monomer with 28.8 g of acrylic acid in 129.8 g of a solution of water and 50% sodium hydroxide. This initial mixture was heated to 80 C.; and then 2.42 g of diammonium peroxysulfate was introduced with 8 g of water. The reaction became extremely exothermic and tended to overflow the reaction vessel. Water in the amount of 17 g was next added with 7.25 g of sodium bisulfite; and this mixture was reheated to 65° C. and maintained at that temperature for three hours.

The average molecular weight of the resultant sulfate co-polymer was determined to be 129,000 by GPC; and the per cent calcium phosphate inhibition at a dosage rate of 10 p.p.m. of the polymer was 97% and at a dosage rate of 7.5 p.p.m. was 12%.

EXAMPLES 4, 5, 6, 7 and 8

Additional co-polymers of mono(acrylamido-ethyl) sulfate were prepared according to the methods described hereinabove; and the resultant products were tested for phosphate scale inhibition with the following results:

| POLYMER COMPOSITION | MOLE RATIO | Mw | PERCENT CALCIUM PHOSPHATE INHIBITION (POLYMER DOSAGE IN P.P.M.) | |
|---|---|---|---|---|
| | | | 7.5 | 10 |
| Acrylic Acid/mono (acrylamido-ethyl) sulfate | 80/20 | 33,200 | 14 | 98 |
| Acrylic Acid/mono (acrylamido-ethyl) sulfate | 90/10 | 9,130 | — | 82 |
| Acrylic Acid/mono (acrylamido-ethyl) sulfate | 70/30 | 6,690 | — | 96 |
| Acrylic Acid/mono (acrylamido-ethyl) sulfate | 30/70 | 192,000 | — | 97 |
| Methacrylic Acid/mono (acrylamido-ethyl) sulfate | 80/20 | 14,300 | 61 | 87 |

EXAMPLES 9, 10 and 11

Various terpolymers of mono(acrylamido-ethyl) sulfate were prepared using the methods previously described. The resulting polymers were characterized by C13 NMR and GPC and residual monomers were determined by GC method. Salient properties and the calcium phosphate screening results are tabulated below:

| POLYMER COMPOSITION | MOLE RATIO | Mw | PERCENT CALCIUM PHOSPHATE INHIBITION (POLYMER DOSAGE IN P.P.M.) | | |
|---|---|---|---|---|---|
| | | | 7.5 | 10 | 20 |
| Acrylic acid/methacrylic acid/ Mono(acrylamidoethyl)sulfate | 52.7/23.7/23.7 | 78,200 | 99 | 99 | — |
| Acrylic acid/methacrylic acid/ Mono(acrylamidoethyl)sulfate | 24.4/51.2/24.4 | 33,500 | 96 | 91 | — |
| Acrylic acid/acrylamidomethyl propanol/mono(acrylamidomethyl propyl)sulfate | 80/10/10 | 8,260 | — | 12 | 96 |

The last listed example was prepared with acrylic acid and mono(acrylamidomethyl-propyl)sulfate. However, the sulfate was partially hydrolyzed during polymerization to give the alcohol. Consequently, terpolymer was formed.

The specific examples herein disclosed are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. The method of inhibiting scale formation in an industrial water system which comprises the step of adding to the water in such a system a scale-inhibiting amount a scale inhibiting agent comprising a polymer of a sulfate monomer having the general structural formula:

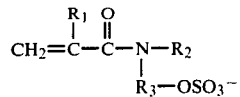

wherein $R_1$ represents either an alkyl group having one to three carbon atoms or a hydrogen atom; wherein $R_2$ represents an alkyl group having one to three carbon atoms, a hydrogen atom, or an alkylol group; and wherein $R_3$ represents a bond, an alkylene group having one to eight carbon atoms, or a phenyl group; and an alkenyl compound having the general structural formula:

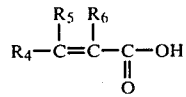

wherein $R_5$ and $R_6$ represent either hydrogen or an alkyl group having one to three carbon atoms, and $R_4$ represents either hydrogen, an alkyl group having one to three carbon atoms, or a carboxylic acid group.

2. The method according to claim 1, wherein said scale-inhibiting amount is from about 5 to about 20 p.p.m.

* * * * *